A. R. BYRKETT.

Assignor to THE CHAMPION SCRAPER COMPANY.

EARTH SCRAPER.

No. 10,370. Reissued Aug. 21, 1883.

WITNESSES:

E. Hough.

C. B. Jones.

INVENTOR:

Abijah R. Byrkett

By: Chas. J. Stoch

Attorney.

N. PETERS, Photo-Lithographer, Washington, D. C.

UNITED STATES PATENT OFFICE.

AHIJAH R. BYRKETT, OF TROY, OHIO, ASSIGNOR TO THE CHAMPION SCRAPER COMPANY, OF SAME PLACE.

EARTH-SCRAPER.

SPECIFICATION forming part of Reissued Letters Patent No. 10,370, dated August 21, 1883.

Original No. 244,432, dated July 19, 1881. Application for reissue filed July 19, 1883.

*To all whom it may concern:*

Be it known that I, AHIJAH R. BYRKETT, a citizen of the United States of America, residing at Troy, in the county of Miami and State of Ohio, have invented certain new and useful Improvements in Earth-Scrapers, of which the following is a specification, reference being had to the accompanying drawings.

This invention relates to improvements in the construction of the scoops of earth-scrapers.

The invention consists in forming the scoop out of two pieces of metal transversely riveted together where the edges of the two portions lap the one over the other, the rear portion being constructed of any suitable metal, while the front portion is constructed either of the same metal of the same or of increased thickness, or else of some tougher metal. Runners formed of strips of steel are bent into bow shape and secured at their ends to the scraper-bottom, and bridge the riveted seam of the two portions of the scoop, a dog or block, preferably of cast metal, being inserted within the bowed runner and riveted thereto and to the scoop, so as to serve as a support to the scoop-bottom at those points and keep the runners on until worn out, as will be hereinafter described.

Figure 1:
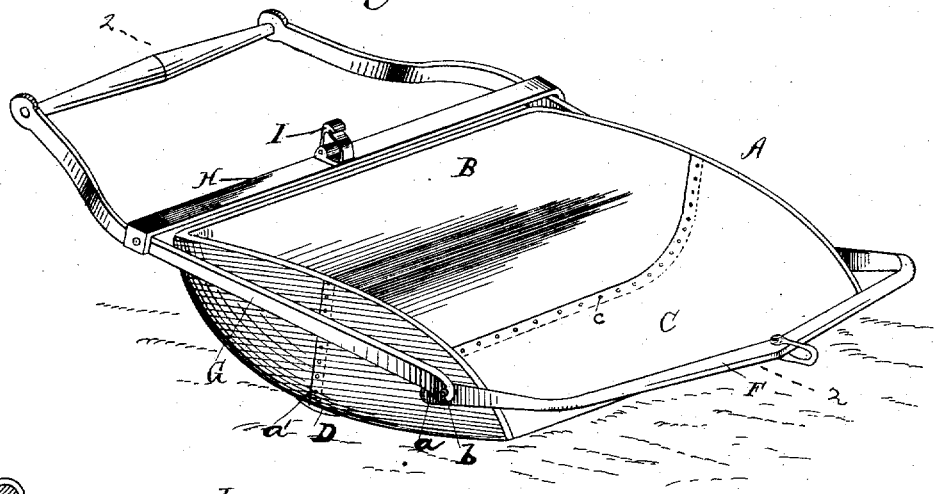
Figure 2:
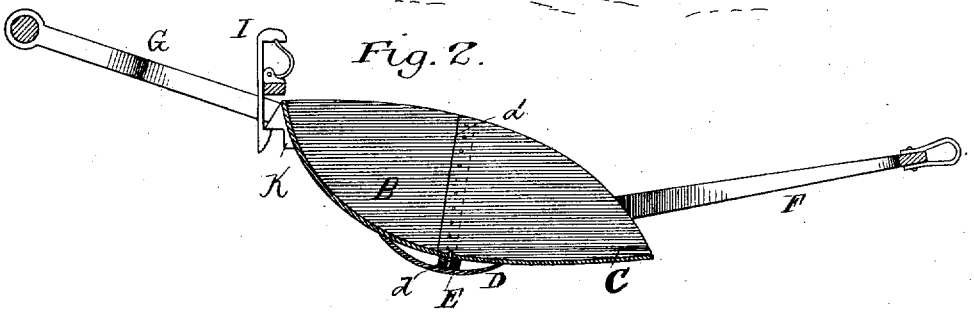
Figure 3:
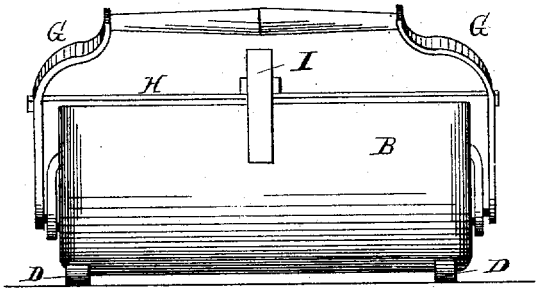

In the drawings, Figure 1 is a perspective view of my improved scraper. Fig. 2 is a section thereof on the line 2 2 of Fig. 1. Fig. 3 is a rear elevation thereof.

According to my present invention, I form the scoop out of two pieces of metal, B C. These pieces are lapped the one over the other at their inner edges, so as to form a seam, *a'*, and are there riveted together. The portion B of the scoop is swaged in suitable dies to a bowl shape, while the front portion, C, is so swaged that its bottom and sides shall be of rounded form.

To strengthen the lapped seam *a'* and protect it from abrasion and wear, I secure to the under side runners, D, consisting, preferably, of strips of steel whose ends are bent upward to impart to the runner a bow shape, said ends being secured to the bottom of the scoop on either side of the seam, so that each runner shall bridge said seam. A dog or block, E, preferably of cast-iron, is inserted between each runner and the scoop-bottom, and is attached to both the runner and scoop-bottom by a bolt or rivet, *d*, which passes therethrough. These dogs serve to still further strengthen the seam *a'* and secure the runners rigidly in position until worn out. By constructing the runners D of flat pieces of steel bowed to leave an open space between them and the bottom of the scoop, I am enabled to avoid the friction caused by the grinding of the earth against solid-sided runners and the scoop-bottom adjacent thereto while the scraper is in operation, because the open space between the runners and scoop-bottom will allow of the earth passing therethrough, instead of remaining in a mass to be rubbed against the scoop-bottom and sides of the runners during the forward movement of the scraper.

The mechanism by means of which the scoop is drawn forward, rigidly held in position for loading, and readily rotated when it is required to dump or load, or return the scoop to position for reloading, consists of the draft-bail F, pivoted to the forward part of the side of front portion, C, of the scoop, handles G, having a cross-bar, H, which rests upon the top of the rear portion of the scoop and holds it down, and a spring-catch, I, to engage with a hook, K, on the rear of the scoop and hold it in position, said handles being pivoted in front of the pivotal connection of the bail to the scoop, so that on raising the rear portion of the handles and of the scraper the bail-arms will press the handles back with relation to the scraper and release the cross-bar H, as fully described in my patent dated July 13, 1880, No. 229,863.

I am aware that scrapers have been formed by swaging the scoop in dies out of a single piece of metal. My invention is designed to overcome the defects present in scrapers where the bowl or scoop is made in one piece, and yet at the same time secure all the advantages secured by such method of construction. By making the scoop in two parts I can swage the separate pieces very easily in dies and form the sides of the scoop of much greater elevation than where the scoop is formed by swaging out of a single piece of metal, thereby giving greater carrying capacity and producing a better formed scraper. Another advantage secured by my construction is that, as the greatest wear and strain occur at the front part of the scraper, I can, when the front part is worn, easily renew it without renewing the whole scoop. When a scoop formed in one piece becomes worn out in any part, the whole scoop would usually have to be renewed. I thus effect a great saving to the users of scrapers by my form of construction. Again, as there is but little wear and tear experienced in use at the rear portion of a scraper-scoop, that part marked B may be made of lighter and cheaper material than is the part marked C, without detriment to the quality or durability of the scraper. A saving in the cost of construction is thus effected that will prove quite an item in manufacturing in quantities.

The scraper, while being quite as effective, more durable, more easily repaired and renewed in the parts likely to become worn, and cheaper in construction than in cases where the scoop is made in one solid piece, is much lighter, and can therefore be carried and also rotated with greater facility.

Having thus described my invention, what I claim, and desire to secure by Letters Patent, is—

1. A scoop or bowl for earth-scrapers, constructed of two pieces of metal, B C, swaged in suitable dies and lapped together by a transverse seam, substantially as described.

2. An earth-scoop having runners D, consisting of a strip of metal and block E, bolted to the bottom of the scoop and within the runner, as and for the purpose described.

3. The earth-scraper herein described, consisting of the scoop A, formed of two pieces of metal, B C, lapped and riveted together transversely of the scoop, the runners D D, of sheet-steel, blocks E, resting within the runners and bolted thereto and to the scoop-bottom, the bail F, handles G, pivoted to the said bail in front of its pivotal connection to the scoop, the bar H, and spring catch I K, substantially as set forth.

AHIJAH R. BYRKETT.

Witnesses:
CHAS. J. GOOCH,
E. P. HOUGH.